United States Patent [19]
Ise

[11] Patent Number: 5,156,381
[45] Date of Patent: Oct. 20, 1992

[54] REFERENCE PLANE MOVING DEVICE
[75] Inventor: Yoji Ise, Tokyo, Japan
[73] Assignee: Myotoku Ltd., Tokyo, Japan
[21] Appl. No.: 671,082
[22] Filed: Mar. 18, 1991
[51] Int. Cl.$^5$ ............................................. B23P 11/02
[52] U.S. Cl. ........................................ 269/21; 269/46
[58] Field of Search ............... 294/64 R, 65; 248/362, 248/363; 269/21, 13, 46; 279/3; 51/235

[56] References Cited
U.S. PATENT DOCUMENTS 3,373,064  3/1968  Junge et al. ............................ 269/21
3,694,894 10/1972  Jelinek et al. .......................... 269/21
3,741,012  6/1973  Day ........................................ 269/21

Primary Examiner—Robert C. Watson
Attorney, Agent, or Firm—Kanesaka and Takeuchi

[57] ABSTRACT

A reference plane moving device comprises an attachment section which is movable along a given reference plane, and a balancer which can operate in correspondence with this attachment section, the attachment section including an air intake hole section capable of creating a vacuum condition between the attachment section and the reference plane by sucking air, and compressed air ejecting hole sections capable of creating a high pressure condition between the attachment section and the reference plane by blowing compressed air against the reference plane. By virtue of a combined action of the vacuum and the high pressure conditions thus created, the attachment section can be kept away from the reference plane by a fixed distance while being attracted thereto. The attachment section with an appropriate attachment can be readily moved on the reference plane.

14 Claims, 6 Drawing Sheets

REFERENCE PLANE MOVING DEVICE

BACKGROUND OF THE INVENTION AND DESCRIPTION OF THE RELATED ART

This invention relates to a device for moving a reference plane and, in particular, to a reference plane moving device which is capable of freely moving an object along a reference plane in the form of a wall surface while keeping the object out of contact therewith, and which can stop the object at a position facing an arbitrary position on the reference plane and attach it thereto.

Generally, there are available various means for moving a given object in a vertical or height direction, and there has conventionally been a demand for bringing, for example, various small-diameter parts of a machine individually and quickly in the height direction up to their respective proper mounting positions at fixed heights on the machine and fixing them to these positions.

It is the object of this invention to meet this demand and provide a device which is capable of moving various objects quickly in the height direction.

SUMMARY OF THE INVENTION

In accordance with this invention, there is provided a device which is capable of moving various objects quickly in a vertical or height direction.

The reference plane moving device of this invention comprises an attachment section which is movable along a given reference plane, and a balancer which can operate in correspondence with this attachment section, the attachment section including an air intake hole section capable of creating a vacuum condition between the attachment section and the reference plane by sucking air, and compressed air ejecting hole sections capable of creating a high pressure condition by blowing compressed air against the reference plane.

DETAILED DESCRIPTION OF THE PREFERRED EMBODIMENT

Figure 1:
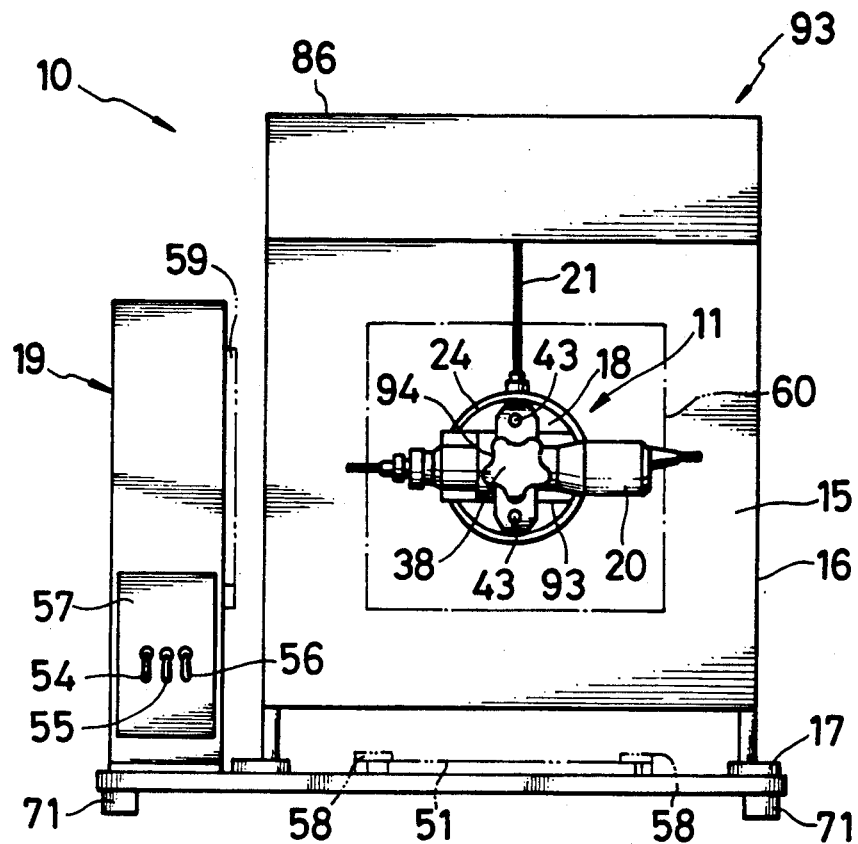
FIG. 1 is a front view showing an embodiment of the reference plane moving device of this invention with an electric driver attached thereto.

The reference plane moving device of this invention will now be described with reference to a preferred embodiment thereof shown in the accompanying drawings. In the following description, the embodiment is presented as a moving device for an electric driver.

As shown in FIGS. 1 through 10, the reference plane moving device 10 of this embodiment is equipped with a working section 93 and a control section 19. These two sections are firmly attached to a base section 17 having a foot 71 in each of its four corners and being formed as rectangular components.

The working section 93 is equipped with a wall section 16 in the form of a rectangular plate set substantially upright over the base section 17, an attachment section 11 arranged on the front surface side of this wall section 16, and a balancer 12 arranged on the back surface side of the wall section 16.

As shown in FIGS. 1 to 3 and 6, the attachment section 11 is equipped with an attachment unit 18 formed generally as a disc, an electric driver mounting section 93 provided on this attachment unit 18, and an operating section 94 provided on the attachment unit 18.

Figure 3:
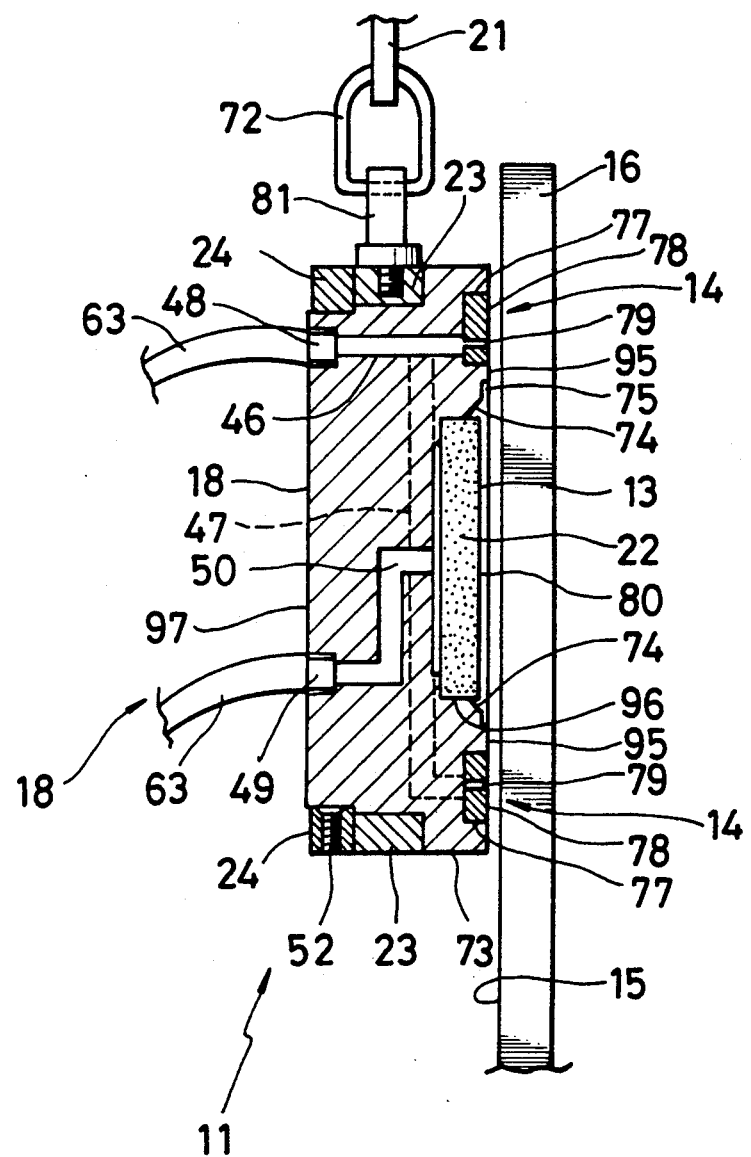
FIG. 3 is a plan view showing an embodiment of the attachment section, which is a component of the reference plane moving device of this invention.

In this embodiment, the surface of the wall section 16 is formed as a smooth reference plane 15 having no surface irregularities, as shown in FIG. 3. The attachment unit 18 has a rear section 95 which faces the reference plane 15. Provided in this rear section 95 are an air intake hole section 13 capable of creating a vacuum condition between the attachment section 11 and the reference plane 15 by sucking air and compressed air ejecting hole sections 14 capable of creating a high pressure condition between the attachment section 11 and the reference plane 15 by blowing compressed air against the reference plane 15.

As shown in FIG. 3, the air intake hole section 13 is provided in the center of the rear section 95 and is formed as a flat circular recess. This air intake section 13 is composed of a filter lodging section 96 formed as a step section, a diverging section 74 diverging outwardly from the filter lodging section 96, and a peripheral recess section 75. It is desirable that the depth of the peripheral recess section 75 be approximately 0.2 to 1 mm.

A filter 22 formed of a synthetic resin or the like is fitted into the filter lodging section 96 and secured therein. The attachment unit 18 has a front section 97, which includes an air outlet hole section 49. Provided between the air outlet hole section 49 and the air intake hole section 13 is an air outlet duct 50 having a crank-like sectional configuration.

The compressed air ejecting hole sections 14 are arranged at appropriate spaces around the air intake hole section 13 in such a manner as to surround this air intake hole section 13. Each of these compressed air ejecting hole sections 14 consists of a recess 77 provided in the rear section 95 and an ejecting hole member 78 fitted into this recess 77 and including an orifice 79. Provided in the front section 97 of the attachment unit 18 is a compressed air intake hole section 48, which communicates with the compressed air ejecting hole sections 14 through a compressed air duct 46. This compressed air duct 46 branches in the middle into a plurality of compressed air ducts 47, each of which communicates with one compressed air ejecting hole section 14 and another compressed air ejecting hole section 14 diametrally opposite thereto in the rear section 95.

Figure 8:
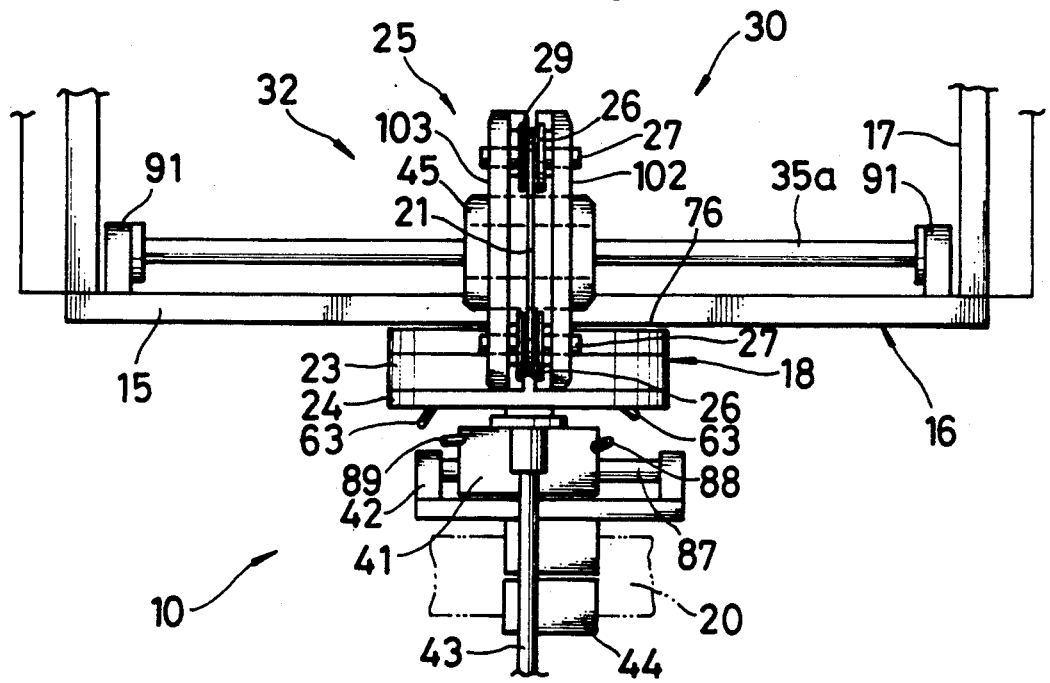
FIG. 8 is a plan view of an embodiment of the reference plane moving device of this invention, showing an upper slide section constituting a slide section.
Figure 9:
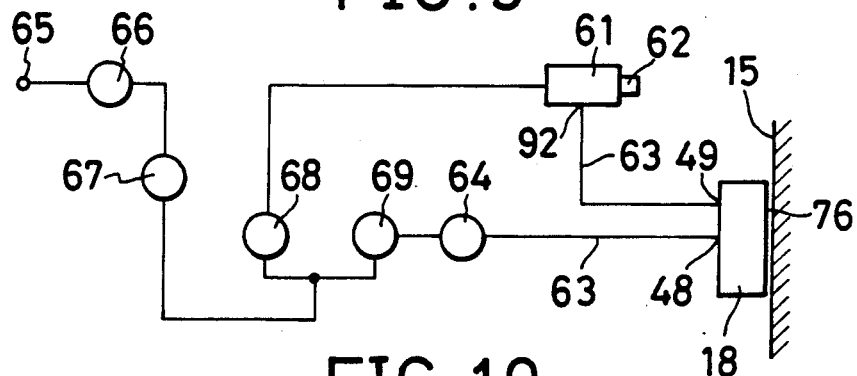
FIG. 9 is a diagram showing a compressed air flow route in an embodiment of the reference plane moving device of this invention.

As shown in FIGS. 3, 8 and 9, flexible tubes 63 are respectively connected to the compressed air intake hole section 48 and the air outlet hole section 49. Through one of these flexible tubes 63, compressed air can be supplied and, through the other, the air in the air inlet hole section 13 can be sucked up so as to create a vacuum condition between the air intake hole section 13 and the reference plane 15.

The quantity of compressed air discharged through the air outlet hole section 49 is appropriately controlled by a flow control valve 64. Further, when attaching the attachment section 11 to the reference plane 15 of the wall section 16, the emission of compressed air can be stopped.

A guide ring member 23 is mounted on the outer periphery of the attachment unit 18 in such a manner as to be rotatable along the side surface 73 of the attachment unit 18. Further, a stationary ring member 24 is firmly attached to the side surface 73 of the attachment unit 18 by means of a screw 52, thus rotatably supporting the above-mentioned guide ring member 23. A suspending member 81 is attached to the guide ring member 23. The attachment unit 18 is linked with the balancer 12 by this suspending member 81 and a link rope 21 and is suspended on the front side of the wall section 16.

The above link rope 21 consists of a stainless wire, a piano wire, or some other type of appropriate thin wire member having large tensile force.

Figure 2:
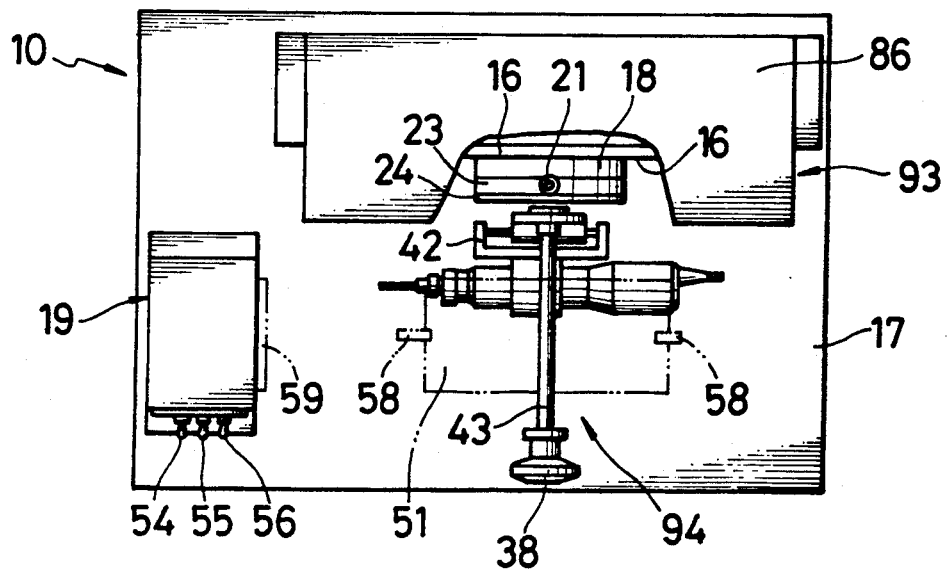
FIG. 2 is a plan view showing an embodiment of the reference plane moving device of this invention with an electric driver attached thereto.
Figure 6:
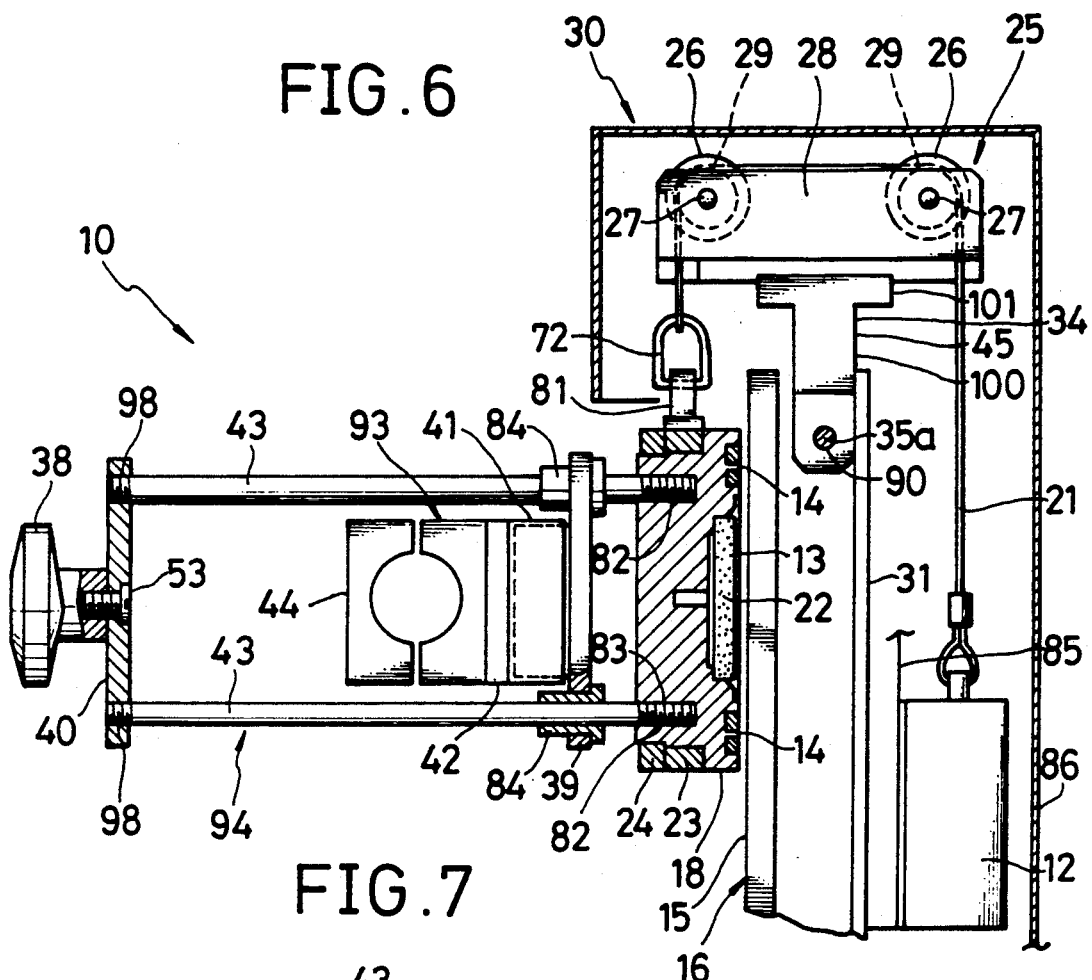
FIG. 6 is a longitudinal sectional view of the upper section of an embodiment of the reference plane moving device of this invention.

As shown in FIG. 6, this attachment unit 18 is equipped with the operating section 94, as stated above. As shown in FIGS. 2 and 6, this operating section 94 has two rods 43 protruding from the front surface of the attachment unit 18 and a handle section 38 provided at the front end of these two rods.

The rods 43 are attached to the attachment unit 18 by means of threaded sections 82 provided at their rear ends and two screw holes 83 provided in the front section of the attachment unit 18. The threaded sections 82 engage the screw holes 83. Provided at the front ends of the rods 43 are threaded sections 98, which engages a handle plate 40, to which the handle section 38 is attached by means of a screw 53.

A mounting plate 39 is attached to these rods 43 at positions in the vicinity of their rear ends through the collars 84. Provided on this mounting plate 39 is the electric driver mounting section 93, which serves as the tool mounting section.

Figure 7:
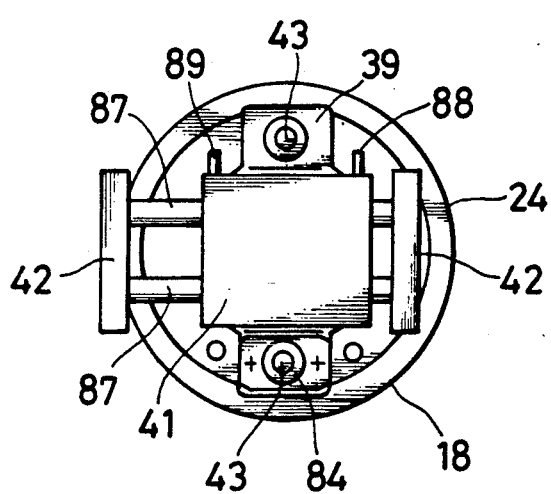
FIG. 7 is a plan view of an embodiment of the reference plane moving device of this invention, showing an electric driver mounting section provided on the body of the attachment section, which is a component of the reference plane moving device.

As shown in FIGS. 6, 7 and 8, this electric driver mounting section 93 is composed of an air cylinder section 41 attached to the mounting plate 39, two rods 87 driven by this air cylinder section 41, brackets 42 respectively attached to the ends of these two rods 87, and an electric driver attaching section 44 attached to these brackets 42 and driven by the air cylinder section 41.

Figure 4:
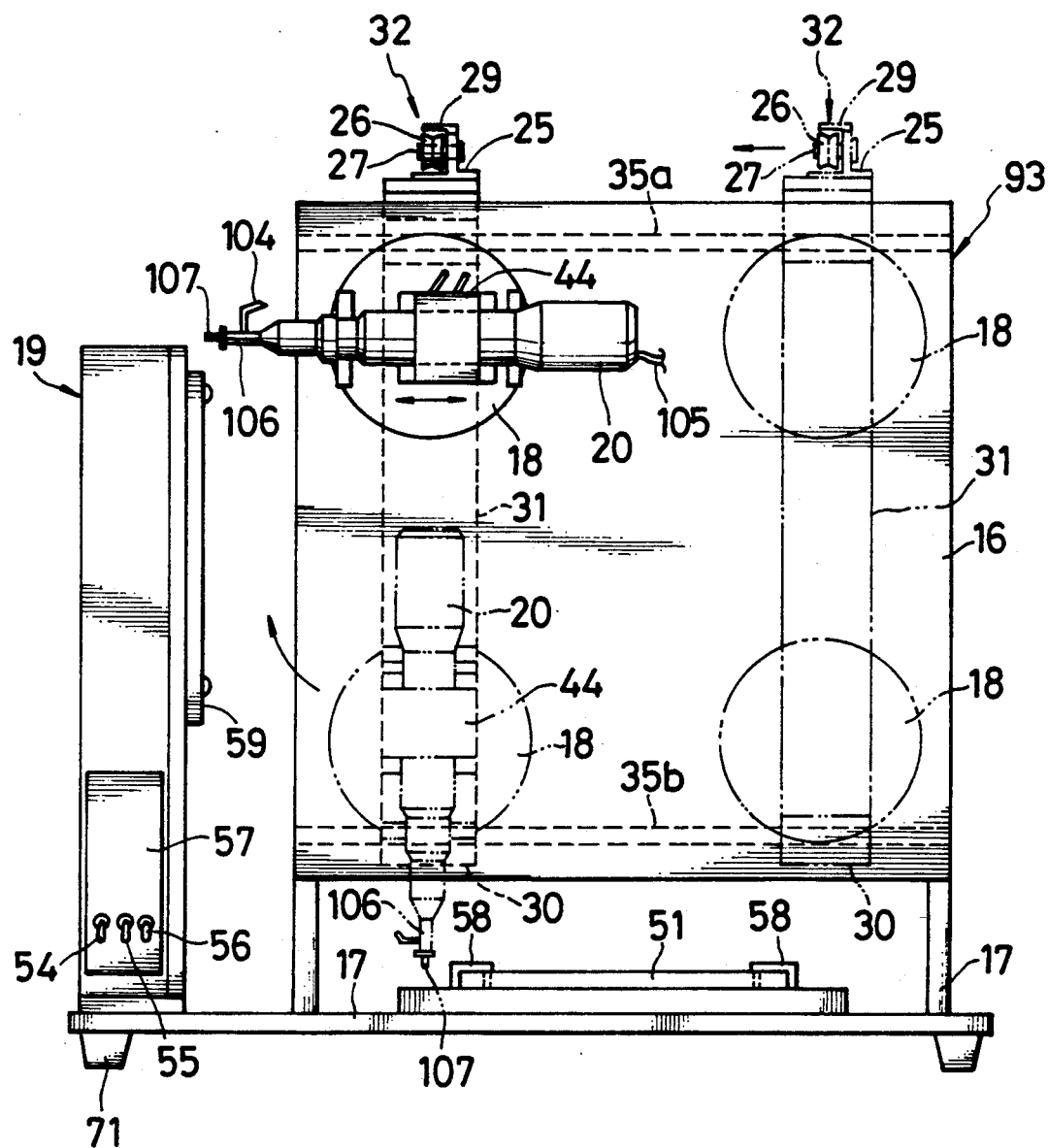
FIG. 4 is a front view showing an embodiment of the reference plane moving device of this invention in the condition where its attachment section with an electric driver attached thereto is being moved along a reference plane.

Compressed air introducing hole sections 88 and 89 are provided on the air cylinder section 41. When compressed air is introduced through the compressed air introducing hole section 88, the rods 87 move to the left (as seen in FIG. 7), and, when compressed air is introduced through the compressed air introducing hole section 89, the rods 87 move to the right (as seen in FIG. 7). Thus, as shown in FIGS. 1, 2 and 4, when an electric driver 20 is attached to the electric driver mounting section 93 of the reference plane moving device 10 of this embodiment, an electric driver 20 can move along the reference plane 15 of the wall section 16.

Further, in the reference plane moving device 10 of this embodiment, the balancer 12 is arranged on the rear surface side of the wall section 16. This balancer 12 has a weight which is substantially identical to the sum of the weights of the attachment section 11 and the electric driver 20 attached thereto, and is linked with the attachment section 11 by the link rope 21, which is led through pulleys 26 constituting an upper slide section 25.

Figure 5:
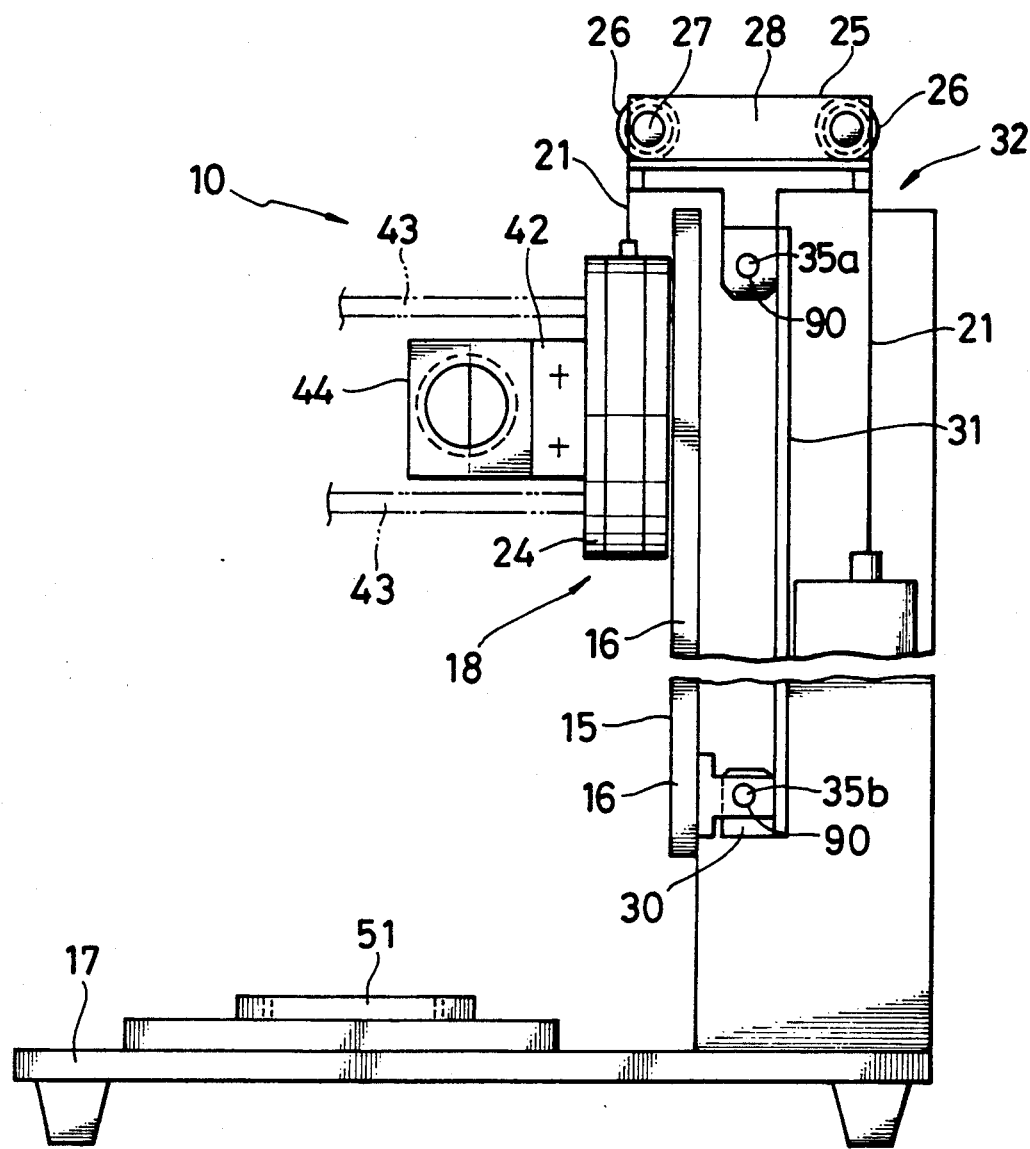
FIG. 5 is a partly omitted side view showing an embodiment of the reference plane moving device of this invention.

As shown in FIGS. 5 and 8, respectively provided in the upper and lower end sections on the rear surface side of the wall section 16 are guide bars 35a and 35b, which are firmly supported by guide bar support sections 91. A slide section 32 is attached to these guide bars 35a and 35b.

This slide section 32 is composed of the above-mentioned upper slide section 25 attached to the upper guide bar 35a, a lower slide section 30 attached to the lower guide bar 35b, and a link section 31 linking the upper and lower guide bars 35a and 35b to each other.

As shown in FIGS. 4, 6 and 8, the upper slide section 25 is equipped with a substantially T-shaped slide support section 34, a pulley mounting section 28 attached to this slide support section 34, and two pulleys 26 mounted on this pulley mounting section 28.

The slide support section 34 is composed of a leg section 100 and an attachment section 101 formed at the upper end of this leg section 100.

Provided at the lower end of the leg section 100 is a slide hole section 90, through which the above-mentioned upper guide bar 35a is slidably inserted. The attachment section 101 has a flat rectangular configuration, and the pulley mounting section 28, which has a rectangular side surface configuration, is attached to this attachment section 101 and extends in the width direction thereof.

As shown in FIG. 8, this pulley mounting section 28 is equipped with two plate-like members 102 and 103 which are spaced apart from each other by a predetermined distance and opposed to each other, and axles 27 which are provided between these two plate-like members 102 and 103 and spaced apart from each other by a fixed distance. Rotatably mounted on these axles 27 are pulleys 26, each of which has a peripheral groove 29, in which the above-mentioned link rope 21 is placed.

The lower slide section 30 is slidably mounted on the lower guide bar 35b. This lower slide section 30 has a rectangular configuration and is equipped with a slide hole section 90, through which the lower guide bar 35b is inserted. The upper and lower slide sections 25 and 30 are connected to each other through the link section 31, which has a thin, rectangular configuration. The slide section 32 is capable of sliding along the upper and lower guide bars 35a and 35b in the lateral direction with respect to the wall section 16.

Provided on the rear surface side of this link section 31 is a balancer control section 85, which serves to prevent the balancer 12 from interfering with the wall portion 16 when it moves.

The slide section 32 and the balancer 12 are covered with a cover member 86, which covers the top section and the rear surface section of the wall section 16.

As stated above, the flexible tubes 63 are respectively connected, as shown in FIG. 8 and 9, to the compressed air intake hole section 48 and the air outlet hole section 49. The feeding of the compressed air to be ejected through the compressed air ejecting hole sections 14 and the sucking of the air out of the air intake hole section 13 are respectively effected through these flexible tubes 63.

As shown in FIG. 9, the attachment unit 18 of the reference plane moving device of this embodiment 10 is connected to a compressed air source 65, which consists of a well-known compressor or the like and which is connected to a main electromagnetic valve 67 through the intermediation of a pressure regulating valve, a filter section 66, etc. The line extending from this main electromagnetic valve 67 branches into two different lines, which are respectively connected to a vacuum side electromagnetic valve 68 and a high pressure side electromagnetic valve 69. The vacuum side electromagnetic valve 68 is connected to an ejector pump 61, the intake hole section 92 of which is connected through one flexible tube 63 to the air outlet hole section 49, which is provided in the attachment unit 18.

The high pressure side electromagnetic valve 69 is connected through the flow control valve 64 and the other flexible tube 63 to the compressed air intake hole section 48, which is provided in the attachment unit 18.

Figure 10:
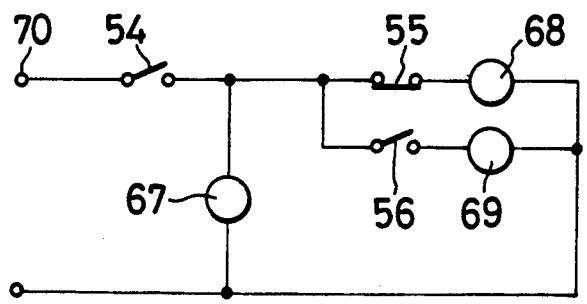
FIG. 10 is a circuit diagram showing an electric circuit for controlling compressed air flow to be used in an embodiment of the reference plane moving device of this invention.

Further, as shown in FIGS. 1 and 4, the control section 19 is equipped with a control panel 57, on which are provided a main switch 54, a vacuum side control switch 55, and a compressed air supply control switch 56. As shown in FIG. 10, the main switch 54, which is connected to a power source 70, is connected to the main electromagnetic valve 67 so as to control this valve. The main switch 54 is further connected to the vacuum control switch 55, which is capable of controlling the vacuum side electromagnetic valve 68, and, at the same time, is connected to the compressed air supply control switch 56, which is capable of controlling the high pressure side electromagnetic valve 69.

In this embodiment, a pallet 51 containing bolts is securely mounted on the base section 17 by means of clamp sections 58, and a work 59 is firmly attached to the inner side surface of the control section 19.

The operation of the reference plane moving device 10, which is constructed as described above, will now be described with reference to a case in which bolts are fastened onto an appropriate work by means of the electric driver 20 attached to the reference plane moving device 10.

In the reference plane moving device 10 of this embodiment, the electric driver 20 of a well-known type is attached to the electric driver attaching section 44 in a substantially horizontal attitude, as shown in FIGS. 1, 2 and 4. As shown in FIG. 4, this electric driver 20 has a power cord 105, a suction pipe 104, etc., and is adapted to start rotating when the tip end 106 thereof is engaged with a bolt 107 or the like and pressed against the section where the bolt or the like is to be fastened. When the fastening has been completed, the electric driver 20 ceases to rotate.

As described above, the reference plane moving device 10 of this embodiment includes the balancer 12, which has a weight substantially equal to the sum of the respective weights of the attachment section 11 and the electric driver 20, and which is linked with the attachment section 11 by the link rope 21 that is led through the pulleys 26 provided on the upper slide section 25 constituting the slide section 32, so that, when it is at rest, the attachment section 11 is on the front surface side of the wall section 16, at a position facing the reference plane 15.

When operating the reference plane moving device 10 of this embodiment, the operator first turns ON the main switch 54 provided on the control panel 57. By this operation, electricity is supplied from the power source 70 to the main electromagnetic valve 67, causing it to open.

As a result, compressed air is supplied from the compressed air source 65 through the main electromagnetic valve 67 to the vacuum side electromagnetic valve 68 and the high pressure side electromagnetic valve 69, as shown in FIGS. 10 and 9. Then, the vacuum control switch 55 is turned ON to open the vacuum side electromagnetic valve 68, thus transferring to the ejector pump 61 the compressed air that is being supplied. The compressed air thus supplied to the ejector pump 61 is ejected onto an ejector hole from a nozzle hole appropriately provided in the ejector pump 61.

Since the air intake hole section 13 provided on the attachment unit 18 communicates with the intake hole section 92 provided on the ejector pump 61 through the flexible tube 63, the air in the air intake section 13 flows through the air outlet duct 50 and enters the ejector pump 61 through the flexible tube 63. Then, air flows to the exterior through a silencer 62. As a result, a vacuum condition is created in the air intake hole section 13, and, the attachment unit 18 is attracted to the reference plane 15 by the vacuum condition created therebetween.

Further, by turning ON the compressed air supply control switch 56, the high pressure side electromagnetic valve 69 is opened, thereby causing compressed air to flow through the flow control valve 64 and the flexible tube 63 and enter the compressed air ducts 46 and 47 through the compressed air intake hole section 48 provided in the attachment unit 18. This compressed air is ejected toward the wall section 16 through a plurality of compressed air ejecting hole sections 14, with a high pressure condition being created between the attachment unit 18 and the reference plane 15.

Thus, the attachment section 11 is under the influence of two difference forces: the force which causes it to be attracted toward the wall section 16 and the force which causes it to be separated away from the wall section. By keeping these forces, i.e., the force due to the attracting action by the vacuum and the force due to the separating action by the ejection of compressed air, to be equal to each other the attachment section 11 can stop in the air at a position on the front surface side of the wall section 16 while being kept out of contact with the reference plane 15 formed on the surface of the wall section 16, with a slight gap being defined between the reference plane 15 and the rear section 95 of the attachment section 11.

In this embodiment, the pallet 51 containing bolts is securely mounted on the base section 17 by means of the clamp section 58, and, at the same time, the work 59 is firmly attached to the inner side surface of the control section 19.

Thus, in this embodiment, the bolts contained in the pallet 51 can be fastened onto the work 59 by using the reference plane moving device 10 to which the electric driver 20 is attached.

When fastening the bolts 107 contained in the pallet 51 onto the work 59 by using the reference plane moving device 10 of this embodiment to which the electric driver 20 is attached, the attachment section 11 is first rotated by manipulating the handle section 38 so as to direct the tip section 106 of the electric driver 20 downwards. Then, the attachment section 11 is moved downwards along the reference plane 15 of the wall section 16. As stated above, the compressed air from the compressed air source 65 is being supplied to the attachment section 11. Accordingly, a vacuum condition has been created in the air intake hole section 13, and, at the same time, compressed air is being ejected through the compressed air ejecting hole sections 14 toward the reference plane 15 of the wall section 16, so that the attachment section 11 moves smoothly along the reference plane 15 of the wall section 16 while keeping out of contact with the reference plane with a fixed gap therebetween and without being separated away from the reference plane 15.

If, in this process, a shake due to the weight of the electric drive 20 occurs to the attachment section 11 while it is moving, any bouncing or vibration of the attachment section 11 is effectively absorbed since the attachment section 11 is constantly being attracted to the wall section 16 with a fixed gap therebetween. Thus, the attachment section 11 can be moved in a stable manner.

Further, as stated above, the attachment section 11 is linked with the balancer 12 arranged on the back surface side of the wall section 16 through the link rope 21, which is led through the two rotatable pulleys 26 arranged on the upper slide section 25 constituting the slide section 32 slidably attached to the guide bars 35. Therefore, the attachment section 11 can move downwards with its weight being kept in balance by the balancer 12. In this process, the balancer 12 is pulled up by the link rope 21, so that it moves upwards for a distance identical to the distance the attachment section 11 moves downwards.

Since the reference plane moving device 10 of this embodiment is equipped with the balancer 12, the weight of the attachment section 11 is substantially offset by the balancer 12, so that the operator can move the attachment section 11 quickly and readily.

If necessary, the attachment section 11 is moved in the horizontal direction so as to bring it to the position of the bolts contained in the pallet 51. As stated above, the attachment section 11 is linked with the balancer 12 arranged on the back surface side of the wall section 16, through the link rope 21, which is led through the pulleys 26 arranged on the upper slide section 25 constituting the slide section 32 slidably attached to the guide bars 35, so that, even when the attachment section 11 is moved in the horizontal direction by manipulating the handle section 38, the attachment section 11 can move horizontally in a smooth fashion either to the left or right.

After the bolt 107 has been appropriately engaged with the tip section 106 of the electric driver 20, the handle 38 is manipulated as shown in FIG. 4, thereby rotating the tip section 106 of the electric driver 20 in the direction of the control section 19 while keeping the attachment section 11 in a non-contact and attracted state with respect to the reference plane 15 of the wall section 16. The electric driver 20 is then set in a substantially horizontal attitude and brought to the bolt fastening position on the work 59 attached to the inner side surface of the control section 19.

If necessary, the attachment section 11 is moved upwards so as to bring the electric driver 20 to a position in front of the bolt fastening position on the work 59 attached to the inner side surface of the control section 19.

Then, the compressed air supply control switch 56, provided on the control section 19, is turned OFF so as to close the high pressure side electromagnetic valve 69, thereby stopping the supply of compressed air to the attachment section 11. As a result, only the vacuum condition created in the air intake hole section 13 remains alive in the attachment section 11, so that the attachment section 11 is attracted to the reference plane 15 of the wall section 16 and attached thereto.

Compressed air is supplied in this state through the compressed air introducing hole section 88 provided in the attachment section 11 so as to operate the air cylinder 41 and move, the electric driver 20 in the direction of the work, to thereby bring the bolt 107 set at the tip of the electric driver 20 to the fastening position.

Afterwards, the electric driver 20 is operated so as to fasten the bolt 107 onto the fastening position on the work 59.

In the reference plane moving device 10 of this embodiment, the attachment section 11 is so designed that it can freely rotate or move within the range indicated by the dashed line 60 of FIG. 1 and be stopped at a desired position, so that, when used with the electric driver 20 mounted thereon, this reference plane moving device 10 can readily move the bolt 107 from the pallet 51 arranged in the lower section of the device up to an appropriate work 59 arranged above the pallet 51 and fasten the bolt 107 to the work 59.

While this embodiment has been described with reference to a case where the reference plane moving device of this invention is used as a moving device for an electric driver, this should not be construed as restrictive. This embodiment is also applicable to other types of tools.

Further, what is to be attached to the attachment section is not restricted to a tool. The reference plane moving device of this invention can be applied to various uses. Further, while the above embodiment has been described with reference to the case where the switches 54, 55 and 56 for controlling compressed air are provided in the control section, this should not be construed as restrictive. They may also be provided in the vicinity of the handle 38 provided in the operating section 94.

Further, while the above embodiment has been described with reference to the case where a smooth vertical surface without any surface irregularities formed on the wall section 16 constitutes the reference plane 15, this should not be construed as restrictive. The reference plane 15 may also consist of a horizontal plane or a slightly inclined plane.

By virtue of the attraction by vacuum, the device can be operated without involving any problem even in a so-called overhang state where the reference plane is forwardly inclined.

Further, even in a case where the reference plane is not flat but curved, the attachment section can move smoothly thanks to the attraction by vacuum.

While this embodiment has been described with reference to the case where the reference plane is formed as a flat and smooth surface, this should not be construed as restrictive. Since compressed air is ejected from the rear section of the attachment section against the reference plane and since the attachment section can move along the reference plane while being kept away therefrom by a fixed distance, the reference plane moving device can be operated without involving any problem even when the reference plane has slight surface irregularities.

Further, while this embodiment has been described with reference to the case where the attachment section and the balancer are linked with each other by a link rope, this should not be construed as restrictive. It is also possible to attach the attachment section to a means such as a robot arm so that the attachment section may move by utilizing the reference plane as a control plane.

Further, while this embodiment has been described with reference to the case where the operator moves the attachment section by manual operation, this should not be construed as restrictive. It is also possible to design the device such that the movement of the attachment section along the reference plane, the movement of the tool or the like attached thereto, etc. can be effected automatically.

Thus, the embodiment described in this specification is only presented by way of example and should not be construed as restrictive. The scope of this invention is indicated by the appended claims, and all the modifications thereby embraced are included in the present invention.

What is claimed is:

1. A reference plane moving device, comprising:
   means for providing a reference plane,
   an attachment section movably disposed in front of the reference plane, said attachment section including an air intake hole section for creating a vacuum condition between the attachment section and the reference plane by sucking air and compressed air ejecting sections for providing high pressure condition between the attachment section and the reference plane by blowing compressed air against the reference plane,
   a slide section formed above the reference plane to be moved laterally along the reference plane,
   a balancer situated behind the reference plane, and
   a link rope connected between the attachment section and the balancer through the slide section to allow the attachment section to move vertically so that the attachment section can be freely moved vertically and laterally along the reference plane by means of the slide section and the link rope.

2. A reference plane moving device as claimed in claim 1, wherein said means for providing a reference plane includes a vertical wall section with a back surface, an upper guide bar provided on an upper section of the back surface of the wall section and a lower guide bar provided on a lower section of the back surface of the wall section, said upper and lower guide bars being arranged laterally to the wall section, said slide section including upper and lower slide sections and a link section attached between the upper and lower slide sections, said upper slide section being slidably attached to the upper guide bar and said lower slide section being slidably attached to the lower guide bar.

3. A reference plane moving device as claimed in claim 1, wherein said attachment section further includes an operating section for moving the attachment section along the reference plane by a user, and a mounting section adapted to mount an attachment to the attachment section so that the attachment can be freely moved along the reference plane.

4. A reference plane moving device as claimed in claim 1, wherein said reference plane is formed on a wall section.

5. A reference plane moving device as claimed in claim 1, wherein said reference plane is formed as a vertical plane.

6. A reference plane moving device as claimed in claim 1, wherein said reference plane is formed on a wall section which is formed as a plate-like member arranged upright on a base section.

7. A reference plane moving device as claimed in claim 1, wherein said balancer has a weight with which the weight of said attachment section and the weight of an attachment can be offset.

8. A reference plane moving device as claimed in claim 2, wherein said link rope is led through pulleys provided on said upper slide section.

9. A reference plane moving device as claimed in claim 1, wherein said attachment section is equipped with an operating section which enables said attachment section to be moved.

10. A reference plane moving device as claimed in claim 1, wherein said attachment section is equipped with a mounting section for mounting an attachment.

11. A reference plane moving device as claimed in claim 1, wherein said air intake hole section and said compressed air ejecting hole sections are provided on that surface of said attachment section which faces said reference plane.

12. A reference plane moving device as claimed in claim 1, wherein said attachment section is formed as a disc-like member having a predetermined thickness, said air intake hole section and said compressed air ejecting hole sections being provided on that surface of said attachment section which faces said reference plane, said attachment section being adapted to be attracted to said reference plane while being kept away therefrom by a fixed distance by virtue of a combined action of a vacuum condition created between said attachment section and said reference plane by sucking air through said air intake hole section and a high pressure condition created between said attachment section and said reference plane by blowing compressed air through said compressed air ejecting hole sections against said reference plane.

13. A reference plane moving device as claimed in claim 12, wherein an orifice is formed in each of said compressed air ejecting hole sections.

14. A reference plane moving device as claimed in claim 1, further comprising a control section capable of separately controlling the vacuum condition created between said attachment section and said reference plane by sucking air through said air intake hole section provided in said attachment section and the high pressure condition created between said attachment section and said reference plane by blowing compressed air through said compressed air ejecting hole sections against said reference plane.

* * * * *